Figure 3:
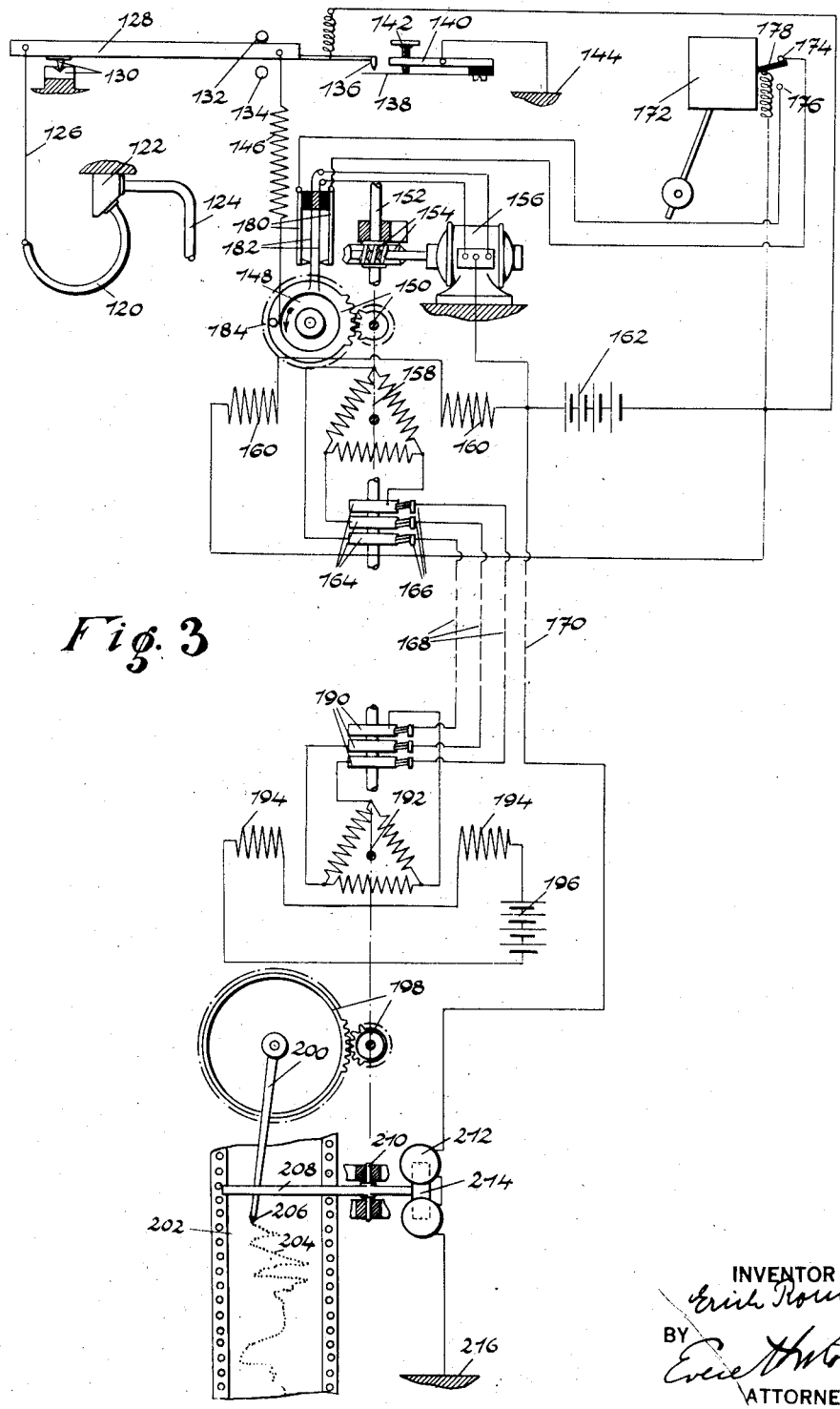

Aug. 31, 1926.
1,597,828
E. ROUČKA
SYSTEM FOR MEASURING OR TRANSMITTING VARIABLE CONDITIONS
Filed March 14, 1923    2 Sheets-Sheet 1
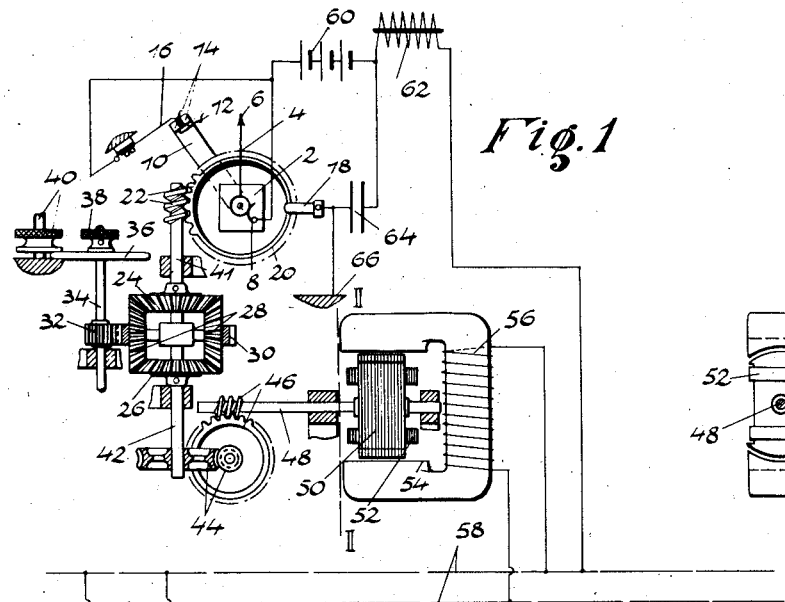
INVENTOR
BY
ATTORNEYS Aug. 31, 1926.

E. ROUČKA 1,597,828

SYSTEM FOR MEASURING OR TRANSMITTING VARIABLE CONDITIONS

Filed March 14, 1923      2 Sheets-Sheet 2

Patented Aug. 31, 1926.

1,597,828

UNITED STATES PATENT OFFICE.

ERICH ROUČKA, OF BLANSKO, CZECHOSLOVAKIA.

SYSTEM FOR MEASURING OR TRANSMITTING VARIABLE CONDITIONS.

Application filed March 14, 1923, Serial No. 625,153, and in Czechoslovakia March 10, 1922.

This invention relates in general to a system for automatically remotely transmitting variations of any quantity, quality or condition, for instance, fluid pressure, temperature, electric current, etc., for any desired purpose, for instance measuring or indicating said variations or for controlling a system or device in accordance with said variations.

More particularly the invention relates to a system of the impulse type in which the variations of the quantity or condition are transmitted by sudden changes, or impulses, of auxiliary energy, for instance, electric current, light or sound waves, fluid pressure, etc., produced in various relations to or at various time positions in equal intervals of time, the said relations or time positions of said impulses to or in corresponding time intervals being determined by the value of the quantity or condition at the time of the impulse, and a measure of the quantity or condition. The said impulses may be transmitted to a receiving, recording or measuring device.

The primary object of the invention is to provide a system of the character described including a plurality of synchronous devices, particularly electric devices, one or more of which are adapted to control transmission or sending of variations in one or more quantities or conditions and others of which are adapted to control the reception or recording of said variations transmitted. The term "synchronous devices" as herein used means devices which must operate in absolute synchronism at all times and do not require periodical synchronizing as is common in known systems, for instance Hugh's telegraphy or as described in United States Patent No. 1,464,034 of October 31, 1922. Such synchronous devices may be for instance synchronous electric motors connected to the same source of alternating current, it being obvious that such motors will remain in absolute synchronism regardless of variations in the frequency of the electric current, and may be used at far distant points without the necessity of periodical synchronization.

Other objects are to provide in such a system means for stopping operation of said synchronously operating devices and means for adjusting the relations of the parts of said devices to cause the cycles of operation of the sending and receiving devices to start synchronously to ensure accurate transmission and recording of said variations, and to obtain other results and advantages as may be brought out by the following description.

The system consists in general of a sending station including a device sensitive or responsive to variations in a quantity or condition to be transmitted or measured cooperating with controlling means operating in cycles of regular intervals of time to produce impulses of auxiliary energy at different time positions in the corresponding intervals dependent upon the then magnitudes of the condition, and a receiving station including means controlled by said impulses of auxiliary energy cooperating with means operating synchronously with said controlling means of the sending station, whereby said impulses are received indicated or recorded and their relations to or time positions in corresponding intervals of time are functions of the variations of the quantity or condition and a measure therefor. The synchronously operating means may be synchronous electric motors at the sending and receiving stations which actuate impulse-sending and impulse-receiving means, respectively, as shown in Figure 1 of the accompanying drawings, or an electric generator at the sending station and a synchronous electric motor at the receiving station, the current from said generator being utilized to drive said synchronous electric motor at the receiving station, and said generator and said motor cooperating, respectively, with impulse-transmitting and impulse-receiving means. In accordance with the invention it is essential that the transmitting means and the receiving means operate synchronously and means is provided for stopping and adjusting said transmitting and receiving means to ensure synchronism thereof.

Referring to the accompanying drawings, in which the same reference characters designate corresponding and like parts, Figure 1 is a diagrammatic illustration of a system embodying my invention in which the synchronously operating devices are synchronous electric motors which operate impulse-transmitting and impulse-receiving means at the respective sending and receiving stations;

Figure 2 is a transverse sectional view taken on the line 2—2 of Fig. 1; Figure 2ª is an enlarged transverse vertical sectional view of a modified form of impulse producing mechanism; Figure 2ᵇ is an enlarged top plan view of the apparatus shown in Figure 2ᵃ, and Figure 3 is a diagrammatic illustration of another system embodying my invention in which a synchronous electric generator is utilized at the sending station for generating current to operate a synchronous electric motor at the receiving station, said generator and motor cooperating, respectively, with impulse-sending and impulse-receiving means.

In the specific embodiment of the invention shown in Figure 1, the reference character 2 designates a device sensitive or responsive to variations in any quantity or quality, for instance fluid pressure which in the present instance oscillates a hand 4 which cooperates with a device operating in cycles of regular intervals of time for producing an impulse of auxiliary energy, the time position of which impulse in the corresponding interval of time is a function of the quantity or quality. In the present instance the device operating in regular intervals of time comprises an arm 10 adapted to be constantly revolved coaxially with the hand 4 by a synchronous self-exciting motor which comprises a rotor 50 mounted on the shaft 48 between pole pieces 54 and carrying short circuit windings 52, said motor being connected through a field winding 56 to any suitable alternating electric current, light or power system 58, preferably a time synchronized constant frequency system.

The arm 10 is shown as driven by a worm gear 20 meshing with a worm 22 carried by a shaft 41 on which is rigidly mounted a bevel pinion 24 meshing with bevel pinions 28 journaled in a ring gear 30 revoluble coaxially with the shaft 41, said pinions 28 also meshing with a pinion 26 carried by a shaft 42 coaxial with the shaft 41 and driven through worm gearing 44 and 46 from the shaft 48 of the motor 50, 54. It will thus be seen that the arm 10 is adapted to be constantly revolved by the motor 50, 54 through the differential gearing 24, 26, 28. The ring gear 30 meshes with a pinion 32 mounted on a shaft 34 which is provided with a thumb nut 38 and also carries a circular disc 36. By rotation of the shaft 34 through the thumb nut 38 the positions of the bevel pinions 28 may be varied with respect to the pinions 24 and 26 so that the relation of the shafts 41 and 42 may be varied. For holding the pinion 32 and ring gear 30 against revolution, a nut 40 is provided for clamping the disc 36 between the said nut and a suitable fixed support. It will be observed that when the disc 36 is released by the nut 40, the pinions 28 may revolve freely around the pinion 24 without driving the shaft 41 and worm gear 20.

In systems of this type an impulse of auxiliary energy is produced once during each cycle or interval of time, said interval or cycle in the present instance being determined by one complete revolution of the arm 10. The auxiliary energy may be of any suitable form, but in the present instance is shown as comprising a source of direct electric current 60 one terminal of which is connected by a brush 8 to the hand 4, the other terminal being connected through a receiving apparatus to the arm 10 by means of a brush 18 bearing on the worm gear 20 and connected to the ground at 66. The hand 4 carries an electrical contact 6 adapted to cooperate with a light contact spring 12 carried by the arm 10 as said arm is rotated, and once during each revolution of the arm 10 the contacts 12 and 6 momentarily engage to close the circuit through the source 60 whereby an impulse or sudden change of the auxiliary energy is produced. The relation of said impulse to or the time position thereof in the interval of time is determined by the position of the hand 4 which is in turn determined by the value of the quantity or quality at the time of engagement of the contacts 6 and 12. It will be understood that the apparatus including parts 2, 4, 6, 20, 10 and 12 as shown on the drawing, is diagrammatically illustrative of the principles involved and other suitable apparatus for the purpose may be used. Where the hand 4 is influenced by a comparatively large amount of power, for instance when the hand is a part of a fluid pressure gauge, a good momentary electrical contact between 6 and 12 in the apparatus shown on the drawing is possible without disturbance of the position of the hand 4 by movement of the contact 12. Where the hand 4 forms a part of an instrument influenced by a small or weak force, other impulse transmitting apparatus is necessary, for instance such as illustrated in Figures 2ᵃ and 2ᵇ of the drawings, or as described in my co-pending application Serial No. 610,388, filed January 2, 1923.

In the apparatus shown in Figures 2ᵃ and 2ᵇ the contacts 6 and 12 are replaced by the contact finger 600 and the cup 1200 containing mercury 1201, respectively. The cup 1200 is mounted on the arm 10 and the contact finger 600 on the hand 4; in operation the mercury 1201 contacts with the finger 600 with a brushing action as the arm is rotated and the friction resulting from such brushing contact is so slight as to produce little or no displacement of the hand 4.

The said impulses of auxiliary energy are shown as transmitted through one wire of the alternating current system 58 to a receiving apparatus, and an inductance 62 and a condenser 64 are shown as connected in the circuit to prevent interference of the alternating current from the system 58 with the direct current system.

The receiving apparatus comprises a synchronous electric motor 70, 72 substantially identical in construction with the motor 50, 54 and connected to the same source 58 of alternating current. The motor 70, 72 is adapted to constantly rotate an arm 88 on an axis 86 through gearing 76 and 78, differential gearing 80, 82 and worm gearing 84. It will thus be seen that the arm 88 is rotated synchronously with the arm 10. The said arm 88 moves over a traveling record strip 92 and carries a pen point 90 normally spaced from said record strip. Once during each revolution of the arm 88 the pen is adapted to be forced into engagement with the record strip 92 by means controlled by the said impulses of auxiliary energy. In the present instance said means comprises electro-magnets 102 cooperating with an armature 100 carried by one end of a lever 96 pivotally mounted intermediate its ends to a fixed support as at 98 and with its other end overlying the arm 88. One terminal of the electro-magnet 102 is connected to the one wire of the system 58 and the other terminal of the electro-magnet is connected to the ground at 104. When the impulse of auxiliary energy is produced by the contacts 6 and 12, the magnets 102 are energized and oscillate the lever 96 to force the pen point 90 into engagement with the record strip 92, and it will be obvious that the pen point at the instant of the said impulse will be in a position over the record strip corresponding to the position of the arm 10. A record curve 94 is thus produced on the strip 92, said curve comprising a plurality of dots each of which represents one impulse of auxiliary energy. An inductance 108 and a condenser 106 are connected in the circuit with the magnets 102 to prevent injury thereto by the alternating current.

The arm 10 is also preferably provided with a pair of spaced insulated electric contacts 14 adapted to engage a spring contact 16 once during each revolution of the arm 10 and produce two impulses of auxiliary energy which actuate the lever 96 and pen 90 so as to form two spaced straight record lines 93 on the record strip 92, each of said lines 93 corresponding to one of the contacts 14. The spring contact 16 is connected to one terminal of the source 60 of auxiliary energy, and the circuit of the impulses produced by the contacts 14 and 16 is otherwise identical with the circuit of the impulses produced by the contacts 6 and 12. By means of the record lines 93 it is possible to determine whether the sending station and receiving station are synchronously operating. If there is lack of synchronism, this may be adjusted by means of the differential gearing 24, 26 and 80, 82. The said differential gearing also enables the arms 10 and 88 to be stopped or started at will by merely releasing or clamping the nut 40 away from or against the disc 36.

In the embodiment of the invention shown in Figure 3, I have shown a system of the compensated or balanced type for transmitting or measuring any quantity or quality. The quantity or quality being transmitted or measured is in the present instance a fluid under pressure which is conducted through a tube 124 to one end of a Bourdon tube 120 the other end of which is connected by a flexible member 126 to one end of a lever 128 fulcrumed intermediate its ends at 130 on a fixed support. The other end of said lever 128 is connected to a compensating spring 146, the tension of which is varied during regular intervals of time, and said end of the lever 128 also carries a contact point 136 adapted to cooperate with a switch mechanism to produce a sudden change or impulse of auxiliary energy once during each of said intervals of time.

A direct current motor 156 drives through gearing 154 a shaft 152 on which is mounted an armature 158 of a synchronous alternating current generator, said armature being revoluble between field coils 160 and being connected to the collectors 164. The motor 156 is driven by a source 162 of direct current the circuit through which is controlled by a time switch 172 comprising a switch blade 178 and spaced contacts 174 and 176 so that the circuit through the motor 156 is alternately reversed in intervals determined by the time switch and the motor caused to alternately rotate in opposite directions. The current generated by the generator 158, 160 is transmitted from the collectors 164 through brushes 166 and conductors 168 to a synchronous motor 192 at the receiving station.

The motor 156 also drives through gearing 150 a disc 148 carrying a pin 184 which is adapted to cooperate with a circuit making and breaking mechanism for breaking the circuit through the motor 156 in regular intervals of time. Said circuit making and breaking mechanism comprises a pair of opposed rigid contact members 180 each of which is connected to one of the spaced contacts 174 and 176 of the time switch, each of said members 180 also cooperating with spring contact strips 182 each of which is connected to one terminal of the motor 156. The contacts 180, 182 are normally closed so that when the contacts 178, 174 or 178, 176 are closed the motor is driven in one direction or the other. Rotation of the motor causes revolution of the disc 148 and the pin 184, and when said pin engages one or the other of the strips 182, the circuit through the motor 156 is automatically broken and the motor remains stationary until the time switch 172 closes the circuit in the opposite direction. The pin 184 is then rotated in a direction opposite to its first-mentioned rotation until it engages the other strip 182 and again breaks the circuit through the motor 156.

The disc 148 also carries a drum to which one end of the spring 146 is connected by a flexible connection so that rotation of the disc 148 varies the tension of the spring 146. Thus, once during each revolution of the disc 146 in each direction the tension of the spring 146 compensates the quantity or quality acting in the Bourdon tube 120 so as to oscillate the lever 128 in one direction. Said oscillation of the lever is limited by spaced stops 130 and 134.

The contact member 136 of the lever 128 is connected to one terminal of the source of auxiliary energy 162, and the other terminal of said source of auxiliary energy is connected through a conductor 170, a receiving apparatus and the ground to one terminal 142 of a switch mechanism 140. Said switch mechanism also includes a contact strip 138 normally in engagement with the other contact member 142 and is adapted to be engaged by the contact member 136 of the lever 128 when said lever is oscillated upon compensation of the quantity or quality by the spring 146. A circuit is thus closed through the source of auxiliary energy 162 so that a sudden change or impulse of auxiliary energy is produced. Excessive movement of the contact member 136 will force the strip 138 away from the contact member 142 so as to break the circuit and limit the duration of the impulse.

The receiving station includes a synchronous electric motor including an armature 192 revoluble between field coils 194 and connected to the collectors 190 which are in turn connected by brushes to the conductors 168 from the synchronous generator 158. A source of current 196 is provided for the field coils 194. It will thus be obvious that the motor 192 will be driven by the current from the generator 158 synchronously with said generator. The shaft of said motor 192 drives through gearing 198 to an arm 200 corresponding to the arm 88 of the system shown in Figure 1. This arm cooperates with a record strip 202 and carries a pen 206 for producing a record curve 204; and said pen 206 is actuated into engagement with the record strip 202 upon each impulse of auxiliary energy by means of the electro-magnets 212 and lever 208 corresponding to the magnets 102 and lever 96 of the system shown in Figure 1.

It will be understood that the arm 200 oscillates alternately in opposite directions synchronously with the oscillation of the disc 148, and that the energization of the electro-magnets 212 takes place simultaneously with the moment of compensation of the quantity or quality in the Bourdon tube 120 and the spring 146 at which moment the impulse of auxiliary energy is produced by the contact 136, 138.

While I have shown electric synchronously operating devices for transmitting and receiving the variations of quantities or qualities, the invention also contemplates the utilization of other devices, for instance fluid actuated mechanisms. For the purpose of illustrating the invention I have described the sending means including the device 2 sensitive to or actuated by fluid pressure, but it will be understood that where other quantities or conditions than fluid pressure are to be measured or transmitted, a suitable instrument sensitive or responsive to the quantity or condition will be substituted for the instrument 2. It will also be understood that the systems illustrated and described are only for the purpose of explaining the principles of the invention, and that the invention is susceptible of embodiment in many other and different systems without departing from the spirit or scope of the invention. Therefore, I do not desire to be understood as limiting myself, except as required by the following claims when construed in the light of the prior art.

Having thus described the invention, what I claim is:—

1. A system of the character described, comprising a plurality of synchronous mechanisms, a transmitting means including means actuated by one of said mechanisms in cycles of regular intervals of time, a source of auxiliary energy, and means responsive to the condition to be measured or transmitted to cooperate with the last-mentioned means at a point in each of said cycles dependent upon the then magnitude of said condition to produce an impulse or sudden change of said auxiliary energy whereby the time position of said impulse of auxiliary energy in the interval of time of the corresponding cycle is a function of the magnitude of the condition at the moment of said impulse, and a receiving means to be actuated in accordance with said time position of said impulse including means actuated by the other of said synchronous mechanisms in cycles of regular intervals of time corresponding to the cycles of the first-mentioned means, and means actuated by said impulses of auxiliary energy to cooperate with the last-mentioned means at a point in the cycle of operation thereof dependent upon the said time position of said impulse of auxiliary energy.

2. A system of the character described, comprising an alternating electric current circuit, a plurality of electric synchronous motors connected in said circuit, means operated by one of said motors in cycles of regular intervals of time, a source of auxiliary energy, means responsive to the condition to be measured or transmitted to cooperate with said motor operated means at a point in each of said cycles dependent upon the then magnitude of said condition to produce an impulse of said auxiliary energy whereby the time position of said impulse in the interval of time of the corresponding cycle is a function of the magnitude of the condition at the moment of said impulse, means operated by the other of said synchronous motors synchronously with the operation of the second-mentioned means, means operated by said impulse of auxiliary energy, and means to cooperate with the last two-mentioned means and operated upon thereby to produce an effect in accordance with the magnitude of said condition being transmitted.

3. The system set forth in claim 1 with the addition of connecting means between one of said synchronously operating mechanisms and the corresponding sending or receiving means to start and to interrupt the actuation thereof by said mechanism.

4. The system set forth in claim 2 with the addition of connecting means between one of said synchronous motors and the means actuated thereby to start or to interrupt actuation of said means by said motors.

5. The system set forth in claim 1 with the addition of a driving connection between one of said synchronously operating mechanisms and the corresponding sending or receiving means, and manually controlled means for adjusting said driving connection to synchronize said sending means and said receiving means.

6. A system of the character described, comprising an alternating electric current circuit, a plurality of synchronous electric motors connected in said circuit, a member driven by one of said motors in cycles of regular intervals of time and carrying an electrical contact, an auxiliary electric circuit including a source of electricity, means responsive to the condition to be measured or transmitted to cooperate with said member at a point in each of the cycles of operation thereof dependent upon the then magnitude of the condition to close said circuit and produce an impulse of said electricity whereby the time position of said impulse in said interval of time is a function of the magnitude of the condition at the moment of said impulse, said auxiliary circuit being connected to one wire of said alternating current circuit to transmit said impulse, means connected to said wire of the alternating current circuit to be operated by said impulse of auxiliary energy, and a member driven by the other of said motors synchronously with said first-mentioned member to cooperate with said last-mentioned means at a point in the cycle of operation of said member dependent upon said time position of said impulse of auxiliary energy.

7. A system of the character described, comprising a plurality of synchronously operating mechanisms, a sending means including a member operated by and synchronously with one of said mechanisms in cycles of regular intervals of time, means including a movable element the position of which corresponds at all times to the magnitude of the condition to be measured or transmitted, said movable element being arranged to be momentarily engaged by said member at a point in each of the cycles of operation of said member dependent upon the position of said element, a source of auxiliary energy, and means controlled by said engagement of said member and element to produce an impulse or sudden change of said auxiliary energy whereby the time position of said impulse in the interval of time in the corresponding cycle of said member is a function of the magnitude of said condition at the time of said impulse, a receiving means including a member operated by the other of said synchronous mechanisms synchronously with the operation of the first-mentioned member, and means operated by said impulse of auxiliary energy into engagement with said last-mentioned member at a point in the cycle of operation thereof dependent upon said time position of said impulse.

8. The system set forth in claim 7 in which the synchronously operating mechanisms are synchronous electric motors connected to the same alternating current circuit.

9. A system of the character described, comprising a plurality of synchronously operating mechanisms, each of which includes a part operated synchronously with the corresponding part of the other mechanism in cycles of regular intervals of time, a source of auxiliary energy, means responsive to the condition to be measured or transmitted, said means being arranged to cooperate with one of said parts at a point in each cycle of operation thereof dependent upon the then magnitude of said condition to produce a sudden change or impulse of said auxiliary energy, whereby the time position of said impulse in the interval of time of the corresponding cycle is a function of the magnitude of said condition at the time of said impulse, and means operated by said impulse of auxiliary energy arranged to cooperate with the other of said parts at a point in the cycle of operation thereof dependent upon said time position of said impulse to produce an effect in accordance with the magnitude of said condition.

10. A system of the character described, comprising a plurality of mechanisms each including a movable part operating synchronously with the corresponding part of the other mechanism in cycles of regular intervals of time, means including a movable member the position of which corresponds to the magnitude of the condition to be measured or transmitted, said movable part of one of said mechanisms and said movable member carrying electrical contacts adapted to momentarily engage at a point in the cycle of operation of said movable part dependent upon the position of said movable member of said responsive means; an electric circuit including a source of auxiliary electric energy, said circuit being closed by engagement of said contacts to produce an impulse of auxiliary electric energy whereby the time position of said impulse in the interval of time of the corresponding cycle of operation of said movable part is a function of the magnitude of said condition at the time of said impulse, means connected in said electric circuit to be operated by said impulse of auxiliary energy, and means cooperating with the last-mentioned means; and said movable part of the other of said mechanisms and operated upon thereby to produce an effect in accordance with the magnitude of the condition being transmitted.

11. A measuring system comprising two relatively movable members one of which is movable in cycles of regular intervals of time and the position of the other of which always corresponds to the magnitude of the condition to be measured, means for producing an impulse of auxiliary energy when the position of one member corresponds to the position of the other member, indicating means, means movable synchronously with said regularly movable member, and means actuated by said impulse of auxiliary energy to cooperate with the last two mentioned means to indicate the time position of said impulse in the interval of time of the corresponding cycle of operation of said regularly movable member.

ERICH ROUČKA.